US011331712B2

(12) United States Patent
Ito

(10) Patent No.: US 11,331,712 B2
(45) Date of Patent: May 17, 2022

(54) TRANSFER MECHANISM AND TRANSFER DEVICE

(71) Applicant: AIDA ENGINEERING, LTD., Kanagawa (JP)

(72) Inventor: Takao Ito, Kanagawa (JP)

(73) Assignee: AIDA ENGINEERING, LTD., Kanagawa (JP)

( * ) Notice: Subject to any disclaimer, the term of this patent is extended or adjusted under 35 U.S.C. 154(b) by 21 days.

(21) Appl. No.: 17/133,571

(22) Filed: Dec. 23, 2020

(65) Prior Publication Data

US 2021/0197246 A1 Jul. 1, 2021

(30) Foreign Application Priority Data

Dec. 26, 2019 (JP) .............................. JP2019-237002

(51) Int. Cl.
  *B21D 43/05* (2006.01)
  *B21D 43/10* (2006.01)
  *B25J 15/00* (2006.01)
  *B65G 47/74* (2006.01)

(52) U.S. Cl.
  CPC ........... *B21D 43/055* (2013.01); *B21D 43/10* (2013.01); *B25J 15/0028* (2013.01); *B65G 47/74* (2013.01); *B21D 43/052* (2013.01); *B25J 15/0052* (2013.01)

(58) Field of Classification Search
  CPC .... B21D 43/052; B21D 43/055; B21D 43/10; B25J 15/0028; B25J 15/0052; B65G 47/74
  USPC .................................................... 414/226.02
  See application file for complete search history.

(56) References Cited

U.S. PATENT DOCUMENTS

2015/0336321 A1* 11/2015 Pinardi ................. B29C 49/70
                                                                425/537
2017/0165738 A1*  6/2017 Ito ......................... B21D 43/055
2020/0404931 A1* 12/2020 Mollet ................. B25J 15/0028

FOREIGN PATENT DOCUMENTS

| JP | S61-009145 U | 1/1986 |
| JP | H02-142629 A | 5/1990 |
| JP | H05-9726 U   | 2/1993 |
| JP | 2005-144555 A | 6/2005 |

* cited by examiner

*Primary Examiner* — Saul Rodriguez
*Assistant Examiner* — Brendan P Tighe
(74) *Attorney, Agent, or Firm* — McDermott Will & Emery LLP

(57) ABSTRACT

A transfer mechanism includes a rail, first and second tables on the rail, first and second arms each having a base pivotably supported by the first and second tables, respectively, and first and second drive mechanisms that move the first and second tables along the rail, respectively. The first and second arms are pivotaly connected to each other at a position between a tip side and a base side. Tip side portions of the first and second arms than a connected portion of the first and second arms serve as fingers for holding a workpiece. The first and second drive mechanisms independently move the first and second tables, respectively. A relative movement of the first and second tables causes the first and second arms to operate a clamp/unclamp operation. A coordinated movement of the first and second tables causes the first and second arms to perform an advance/return operation.

8 Claims, 7 Drawing Sheets

TRANSFER MECHANISM AND TRANSFER DEVICE

TECHNICAL FIELD

The present invention relates to a transfer mechanism and a transfer device for use in a pressing machine. More specifically, the present invention relates to a transfer mechanism and a transfer device used to supply a workpiece to a die, transfer a workpiece between dies, and take out a processed workpiece.

BACKGROUND ART

As a material (workpiece) transfer device for a pressing machine, a 3D (three-dimensional) transfer device is known. In a conventional 3D (three-dimensional) transfer press, workpieces each in the middle of being formed at a stage among a plurality of stages are simultaneously transferred to the subsequent stage by the operations of clamping (gripping the workpiece), lifting (raising), advancing (forwarding), letting down (lowering), unclamping (releasing the gripping of the workpiece), and returning (retracting) the two feed bars. During the return operation, press working is performed (see Patent Document 1).

In Patent Document 1, a ball screw/nut mechanism is used as a mechanism, such as, e.g., a feed carrier, for converting a rotary motion of a servo motor into a linear reciprocating motion. On the other hand, a transfer device has also been developed in which a linear motor is interposed in the linear motion section (see Patent Document 2). In this device, a feed carrier is provided above a pair of left and right bars fixed to the pressing machine, and the feed carrier is reciprocally driven by a linear motor interposed between the feed carrier and the bar.

As a transfer device, in addition to the above-described 3D (three-dimensional) transfer device, a 2D (two-dimensional) transfer device is also known in which no lift/down motion is performed. Further, other than a transfer device equipped with two feed bars, a single-bar type transfer device is also known in which fingers for gripping a workpiece with a spring biasing force or air drive are provided (see Patent Document 3, Patent Document 4).

PRIOR ART DOCUMENT

Patent Document

Patent Document 1: Japanese Unexamined Utility Model Application Publication No. H5-9726
Patent Document 2: Japanese Unexamined Patent Application Publication No. 2005-144555
Patent Document 3: Japanese Unexamined Utility Model Application Publication No. S61-9145
Patent Document 4: Japanese Unexamined Patent Application Publication No. H2-142629

SUMMARY OF THE INVENTION

Problems to be Solved by the Invention

In a transfer device of Patent Document 1, it is required to transfer, in addition to the two feed bars, fingers mounted on the feed bars and workpieces in all stages. Further, the feed bars with large inertia (i.e., inertia or inertial force) are accelerated and decelerated at high speed and are further moved up and down. Therefore, a high-output servo motor is required. On the other hand, in the device of Patent Document 2, without driving the entire feed bars, a feed carrier movably provided on fixed bars is reciprocally moved with a linear motor. Therefore, the motor output can be reduced. However, clamping and unclamping are driven by a linear motor provided to the feed carrier, and lifting and lowing are driven by a linear motor provided to the clamp carrier. Therefore, this device also needs to drive a considerably large inertia load, so high-output motor is inevitable.

In the transfer devices of Patent Documents 3 and 4, no motor is required because the gripping operation is performed by a spring or an air cylinder. However, the entire feed bars are advanced and returned, so a high-power motor is required to drive the feed bars.

An object of the present invention is to provide a transfer mechanism and a transfer device capable of being driven with a low-power motor and further reducing the number of motors.

Means for Solving the Problem

A transfer mechanism 10 according to the present invention includes: a rail 11; a first table 12 and a second table 13, the first table 12 and the second table 13 being movably mounted on the rail 11; a first arm 18 and a second arm 19, the first arm 18 and the second arm 19 each having a base (25) pivotably supported by the first table 12 and the second table 13, respectively, and a first drive mechanism 15 and a second drive mechanism 16 being configured to move the first table 12 and the second table 13 along the rail 11, respectively. The first arm 18 and the second arm 19 are pivotally connected to each other at a position (17) between a tip side and a base side thereof. Tip side portions of the first arm 18 and the second arm 19 than a connected portion of the first arm 18 and the second arm 19 serve as fingers 21 and 22 for holding a workpiece W. The first drive mechanism 15 and the second drive mechanism 16 are configured to independently move the first table 12 and the second table 13, respectively, so that a relative opposite movement of the first table 12 and the second table 13 by the first drive mechanism 15 and the second drive mechanism 16 causes the first arm 18 and the second arm 19 to perform a clamp/unclamp operation. A coordinated movement of the first table 12 and the second table 13 in the same direction causes the first arm 18 and the second arm 19 to perform an advance/return operation.

In such a transfer mechanism 10, preferably, the first table 12 and the second table 13 each are composed of a table body 12b provided with an inclined guide 12a and an arm base 12c slidably provided along the inclined guide 12a, a base of the first arm 18 and a base of the second arm 19 are pivotably supported by the respective arm bases 12c and 13c, and the inclined guide 12a of the first table 12 and the inclined guide 13a of the second table 13 are inclined in opposite directions so as to be gradually away from each other as they go upward.

In the transfer mechanism 10 equipped with such inclined guides 12a and 13a, the arm base 12c, 13c is preferably biased downward of the inclined guide 12a, 13a.

In any one of the transfer mechanisms 10, more preferably, a plurality of sets of the first table 12 and the second table 13 is provided on the rail 11. The first drive mechanism 15 is configured to collectively move a plurality of the first tables 12, and the second drive mechanism 16 is configured to collectively move a plurality of the second tables 13.

The transfer device 40, 45 of the present invention includes any two of the above-described transfer mechanisms 10, wherein the two transfer mechanisms 10 are arranged to face each other. In such a transfer device 40, 45, preferably, the first tables 12 of the two transfer mechanisms 10 arranged to face each other are driven by a single first drive mechanism 15, and the second tables 13 of the two transfer mechanisms 10 arranged to face each other are driven by a single second drive mechanism 16.

Effects of the Invention

In the transfer mechanism of the present invention, it is not required to drive entire feed bars, and it is possible to perform advance/return operations and clamp/unclamp operations with only the first and second drive mechanisms that move the first and second tables along the rail. Therefore, the drive mechanism can be driven at high speed with a low-output motor. Further, the number of motors can be reduced.

Further, when the first table and the second table are moved away from each other, the tip sides of the first and second arms and the first and second fingers move toward the base sides while opening the first and second arms and the first and second fingers, so that the tip sides thereof are moved toward the base sides to be away from the workpiece in the die. Conversely, when the first and second tables are moved closer to each other, the tip sides of the first and second arms and the first and second fingers are moved toward the die side to approach the workpiece in the die while closing the first and second arms and the first and second fingers. Therefore, the die and the fingers are good in mutual arrangement, so that the space-saving can be achieved. In addition, when the first and second tables are being moved in the same direction by the advance/return operation, when the moving speeds of the respective tables are changed, the tables are relatively moved in opposite directions. By relatively moving the tables in opposite directions as described above, it is possible to make the first and second arms perform the clamp/unclamp operation while making them perform the advance/return operation. This makes it possible to increase the transfer rate.

In cases where the first table and the second table each are composed of a table body provided with an inclined guide and an arm base slidably provided along the inclined guide, a base of the first arm and a base of the second arm are pivotably supported by the respective arm bases, and the inclined guide of the first table and the inclined guide of the second table are inclined in opposite directions so as to be gradually away from each other as they go upward, when the first and second tables are brought closer, the table body and the arm base come closer. Then, the first and second arms and the fingers close to clamp the workpiece. When the first and second tables are brought closer to each other after clamping the workpiece, the arm bases cannot come further closer to each other. Therefore, the arm bases are raised to make the first and second arms perform the lift operation.

From this state, when the first and second tables are away from each other, the arm bases are lowered. Thereby, it is possible to make the first and second arms perform the downward operation. When the first and second tables are further away from each other, the first and second arms unclamp the workpiece. Therefore, it is not necessary to separately provide a lift/down drive source.

In cases where the first and second tables each are composed of the above-described table body provided with the inclined guide and the above-described arm base, when the arm base is biased downward of the inclined guide, the clamp operation is more reliable. Further, when moving the first and second tables away from each other, the downward movement of the arm base is further ensured.

In any one of the above-described transfer mechanisms, in cases where a plurality of sets of the first table and the second table is provided on the rail, the first drive mechanism is configured to collectively move a plurality of the first tables, and the second drive mechanism is configured to collectively move a plurality of the second tables, it is possible to simultaneously transfer a plurality of workpieces to the respective subsequent stages.

The transfer device according to the present invention can transfer a large workpiece by the coordinated motion (coordinated movement) of the first and second arms facing each other. In such a transfer device, in cases where the first tables of the two opposing transfer mechanisms are driven by a single first drive mechanism, and the second tables of the two opposing transfer mechanisms are driven by a single second drive mechanism, it is possible to reduce the number of drive mechanisms.

EMBODIMENTS FOR CARRYING OUT THE INVENTION

Figure 1A:
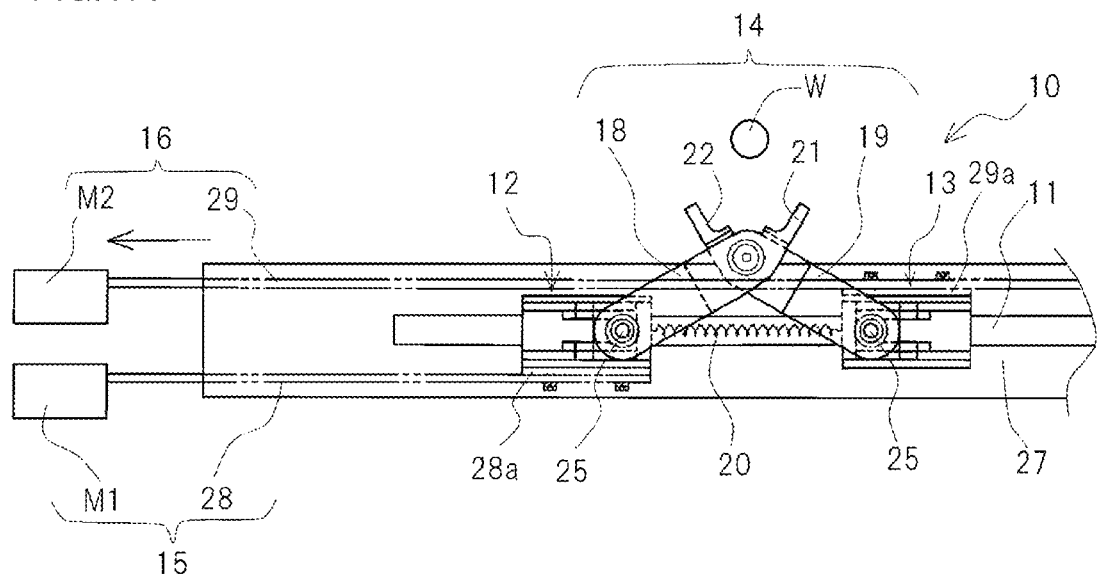
FIG. 1A is a plan view showing an embodiment of a transfer mechanism of the present invention in an unclamped state.

The transfer mechanism 10 shown in FIG. 1A is composed of a single rail 11, a first and second tables 12 and 13 slidably provided on the rail 11, a plier mechanism 14 provided across both the tables 12 and 13, and first and second drive mechanisms 15 and 16 for driving the respective tables 12 and 13 along the rail 11. The plier mechanism 14 is composed of first and second arms 18 and 19 and a pin (plier fulcrum) 17 for pivotally connecting respective portions of the arms 18 and 19 between the tip side and the base side thereof. A tension spring 20 is interposed between the first table 12 and the second table 13.

Figure 1B:
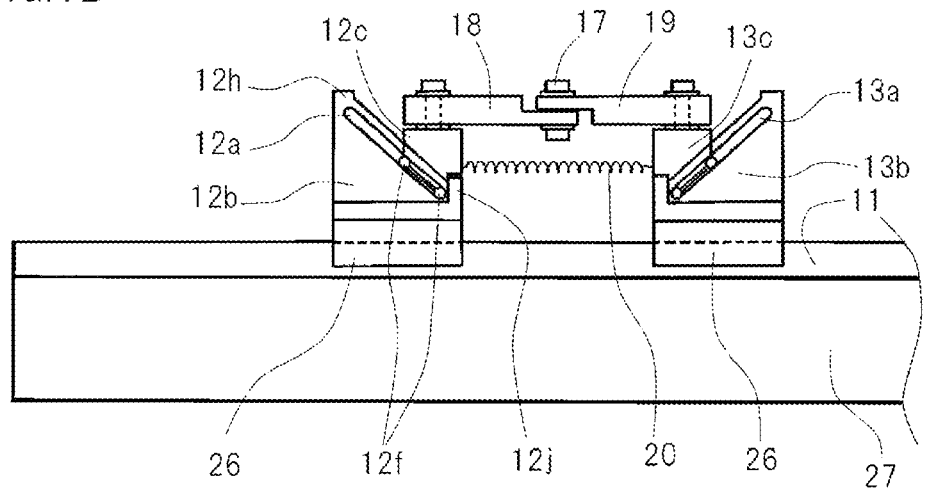
FIG. 1B is a front view showing the transfer mechanism.

As shown in FIG. 1B, the vicinity of the tip end of each of the first and second arms 18 and 19 is halved in the thickness, and both of them are connected in a pivotable manner in a horizontal plane by the above-described pin (plier fulcrum) 17. The tip side portions of the first and second arms 18 and 19 than the pin 17 are served as fingers 21 and 22 for gripping a workpiece W. The base portions of the first and second arms 18 and 19 each are attached to the respective tables 12 and 13 to be pivotable about the respective support shafts (arm fulcrums) 25. In cases where each arm 18 and 19 is composed of a single plate as in this embodiment, it may be configured such that the tip side of one of the arms is formed in a single crest (convex) shape and the tip side of the other arm is formed in a double crest (concave) shape, and both tip sides are connected by a pin 17 in a combined state. Alternatively, it may be configured such that one of the first and second arms is configured by two plates, the other of the first and second arms is configured by a single plate, and the two plates sandwich the single plate. Alternatively, the respective arms may be configured by two plates.

Since the first and second tables 12 and 13 are substantially symmetrically opposite, the first table 12 on the left side will be basically described. The table 12 is composed of a table body 12b having an inclined guide 12a and an arm base 12c slidably provided along the inclined guide 12a. The above-described tension spring 20 is interposed between the arm bases 12c and 13c so that the arm bases 12c and 13c are biased in a direction to reduce the distance therebetween. The inclined guides 12a and 13a of both the tables 12 and 13 are inclined opposite to each other so as to be gradually away from each other as they go upward. That is, the inclined guides 12a and 13a are inclined such that one ends thereof on the facing sides of both the tables 12 are 13 are low and the other ends thereof on the other sides of both the tables 12 and 13 are high.

Figure 1C:
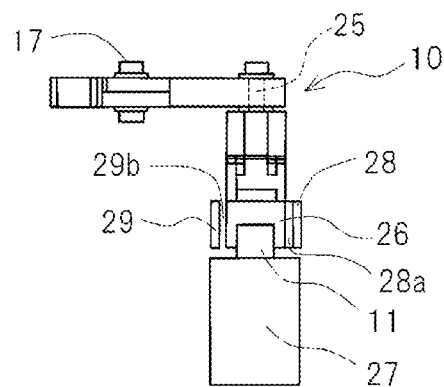
FIG. 1C is a side view showing the transfer mechanism.
Figure 2A:
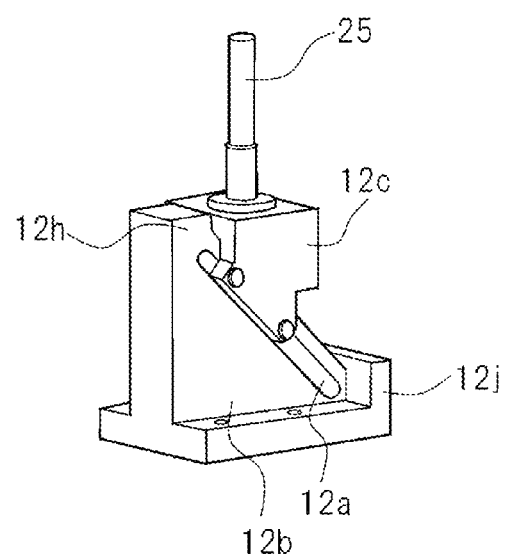
FIG. 2A is a rear perspective view of a first table (second table).
Figure 2B:
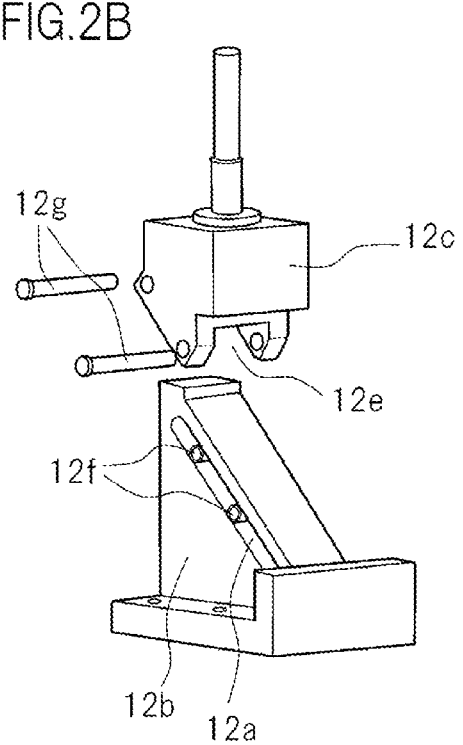
FIG. 2B is an exploded perspective view of the first table (second table).
Figure 2C:
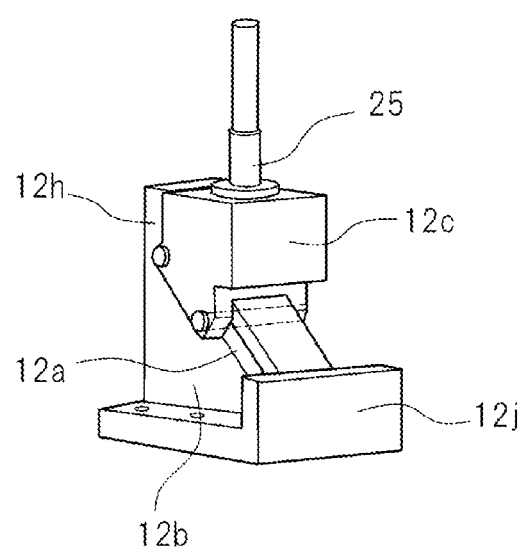
FIG. 2C is a front perspective view of the first table (second table).
Figure 2D:
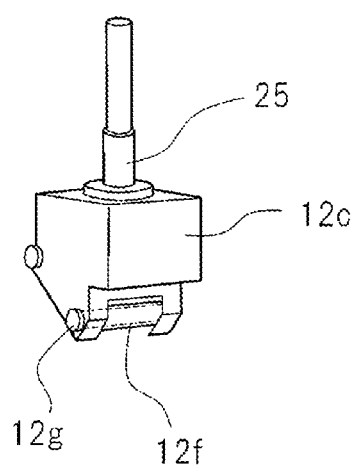
FIG. 2D is a front perspective view of an arm base.

The upper portion of the table body 12b is configured by a substantially triangular plate as seen from the side, and a guide groove penetrating the plate is formed as an inclined guide 12a. The inclined guide 12a may be configured by a ridge or the like, other than a groove. As shown in FIG. 2A to FIG. 2D, a groove 12e is formed on the lower surface of the arm base 12c so that the upper portion of the table body 12b is inserted therein. Furthermore, at the lower end of the arm base 12c, two guide rollers 12f which slide or rotate in the groove of the inclined guide 12a are attached. The guide rollers 12f are connected to the arm base 12c by guide pins 12g, and their guide rollers 12f rotatably move in the groove of the inclined guide 12a. In place of the guide roller 12f, a pin or a slide block may be provided. At the lower end of the table body 12b, a slide portion 26 which moves along the rail 11 is provided (see FIG. 1C). The rail 11 and the slide portion 26 may be configured by, other than a slide-type linear guide, a linear ball guide in which balls are provided. The rail 11 is supported by a support member 27.

In this embodiment, the groove of the inclined guide 12a penetrates the plate of the table body 12b. However, a non-penetrated shallow groove may be formed on both sides of the table body 12b. Further, the table body 12b is configured by a plate having an inclined surface at the upper end, and the groove 12e for inserting the upper portion of the plate is formed on the lower portion of the arm base 12c. However, it may be conversely configured such that a groove is formed on the upper end of the table body 12b and the lower portion of the arm base 12c is inserted in the groove.

Figure 3A:
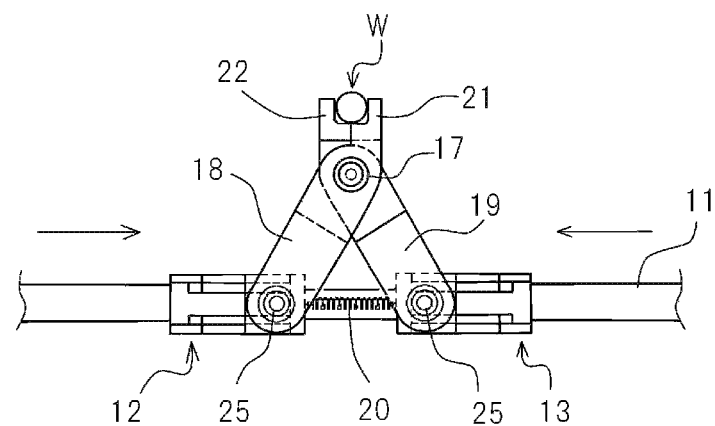
FIG. 3A is a plan view of the transfer mechanism of FIG. 1A in a clamped state.
Figure 3B:
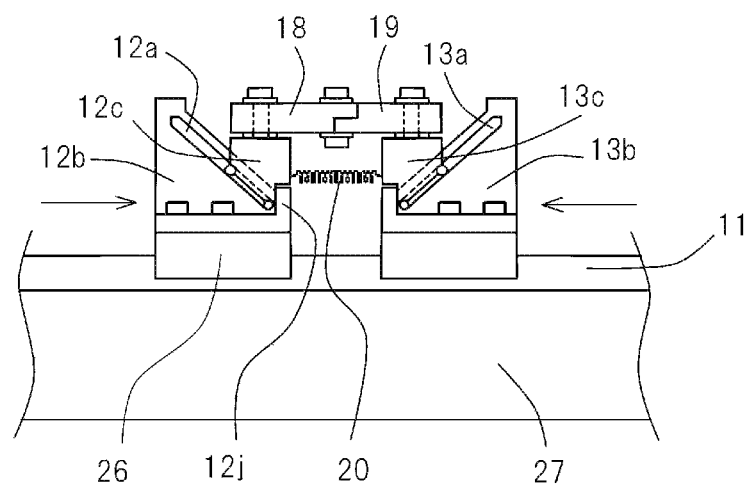
FIG. 3B is a front view of the transfer mechanism of FIG. 1A in a clamped state.

Furthermore, in this embodiment, both the arm bases 12c and 13c are biased to come closer to each other by the tension spring 20. Both the arms 18 and 19 are biased in a direction in which the base sides thereof close about the pin (plier fulcrum) 17. Therefore, for example, from the state shown in FIG. 1A and FIG. 1B, when the tables 12 and 13 are brought closer to each other, the arm bases 12c and 13c are not raised along the grooves of the inclined guides 12a and 13a, and the closing operation as shown in FIG. 3A and FIG. 3B is prioritized. This stabilizes the opening and closing operation.

As described above, in this embodiment, since both the arm bases 12c and 13c are biased so as to be brought closer to each other by the tension spring 20, a single tension spring can serve as a biasing means of both the arm bases 12c and 13c (a biasing means between the arm bases 12c and 13c and the table bodies 12b and 13b). Furthermore, the magnitude of the biasing force can be made the same. It may be, however, configured such that a tension spring is provided between the table body 12b, 13b and the arm base 12c, 13c so that the arm base 12c, 13c is biased obliquely downward along the groove of the inclined guide 12a. A tension coil spring is preferably used as the tension spring. Alternatively, a compression coil spring may be interposed between the table body 12b, 13b and the arm base 12c, 13c.

The fingers 21 and 22 are formed so as to have a gap equal to or somewhat narrower than the thickness or the diameter of the workpiece W when closed (see FIG. 3A). An elastically deformable sheet or the like may be attached to the surface of the finger 21, 22 which comes into contact with the workpiece so as to absorb the manufacturing error and/or the control error. The swing angle of one of the arms 18 about the arm fulcrum 25 is preferably set to about 0° to 30° in the initial arm angle (angle at the time of unclamping) and about 60° to about 80° at the time of clamping, provided that the state in which the arm 18 is opened and is horizontal with respect to the longitudinal direction of the first connection bar 28 is defined as 0°. In the case of setting the initial arm angle to near 0°, it is required to apply an initial force about the arm fulcrum 25 by a torsion coil spring 20a or a leaf spring so that the arms 18 and 19 can move toward the clamping side when both the arm bases 12c and 13c are about to approach to each other (see FIG. 9 and FIG. 9B). The torsion coil spring 20a for giving the initial force about the arm fulcrum 25 can also be used as a substitute for the tension spring 20. When the initial arm angle is about 30°, the clamp/unclamp operation can be performed only by the tension spring 20. The ratio of the base side length of the arm 18 (the distance between the plier fulcrum 17 and the arm fulcrum 25) to the length of the finger 21 is preferably about 2:1 to about 5:1. With this, the boosting action by the plier mechanism 14 becomes about 2 times to about 5 times.

Returning to FIG. 1A, the first and second drive mechanisms 15 and 16 are composed of a first connection bar 28, a second connection bar 29, a first motor M1 and a second motor M2. The first connection bar 28 is fixed via a spacer 28a to the front surface (lower side of the drawing) of the first table 12 on the left side of the drawing. The second connection bar 29 is fixed via a spacer 29a to the rear surface (upper side in the drawing) of the second table 13 on the right side of the drawing. The first motor M1 and the second motor M2 are configured to independently drive the respective connection bars 28 and 29. A gap 29b is provided between the first table 12 and the second connection bar 29. The motor M1, M2 and the connection bar 28, 29 may be connected via a rotation-linear motion conversion mechanism (see FIG. 4) such as a combination of a ball screw and a ball nut.

Next, the operation of the transfer mechanism 10 configured as described above, in particular, the operation around the arms will be described. In this transfer mechanism 10, the state in which both the tables 12 and 13 are away from each other as shown in FIG. 1A is an unclamped state. In this state, the arms 18 and 19 are opened, and the tips thereof are moved (retracted) toward the rail 11. The fingers 21 and 22 are also opened and away from the workpiece W arranged on a die, a rest-stage or the like. Further, as shown in FIG. 1B, the arm bases 12c and 13c are lowered to the lower end.

From this state, when the table bodies 12b and 13b are driven to be brought closer to each other by the drive mechanisms 15 and 16, the distance between the base sides of the arms 18 and 19 becomes narrow as shown in FIG. 3A. The first and second arms 18 and 19 pivotally rotate about the respective arm fulcrums 25 to close. With this, the fingers 21 and 22 are closed to clamp the workpiece W on the die (Clamp Operation). At this time, the tension spring 20, which has been tensioned, is loosened, but the pulling force remains. The biasing force of the tension spring 20 can be utilized as the clamping force of the workpiece.

Figure 4A:
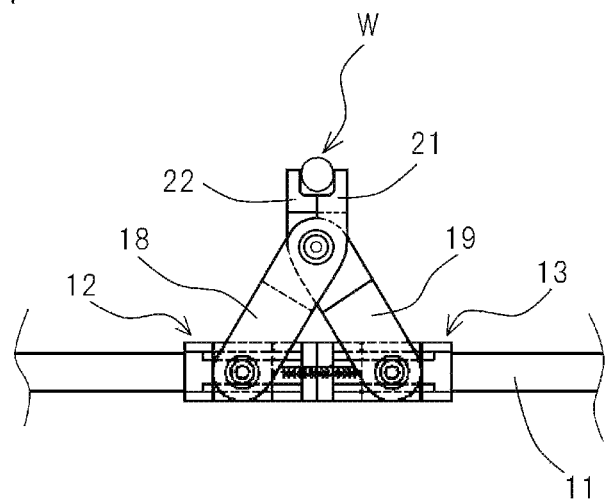
FIG. 4A is a plan view of the transfer mechanism in FIG. 1A in a clamped-lifted state.
Figure 4B:
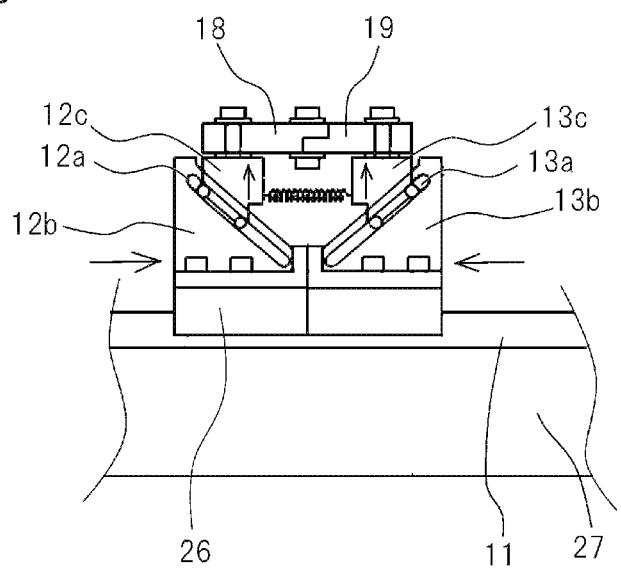
FIG. 4B is a front view of the transfer mechanism in FIG. 1A in a clamped-lifted state.

From the state of FIG. 3A and FIG. 3B, when the left and right table bodies 12b and 13b are brought closer to each other, since the fingers 21 and 22 are clamping the workpiece W, the arms 18 and 19 do not close any further. Then, as shown in FIG. 4A and FIG. 4B, the arm bases 12c and 13c are raised along the inclined guides 12a and 13a (Lift Operation). At that time, the fingers 21 and 22 are raised while clamping the workpiece W, so that, for example, the formed workpiece W is lifted from the die or the like. The rising end is regulated by the upper stopper 12h. Provided that the operations of the table bodies 12b and 13b are symmetrical and the angles of the inclined guides 12a and 13a are equal, the arm bases 12c and 13c are raised at a right angle with respect to the rail 11. Note that controlling the rotational speeds of the first motor M1 and the second motor M2 makes it possible to raise the arm bases in any trajectory, such as, e.g., diagonally. The same can be applied to the lowering trajectory.

From the state shown in FIG. 4A and FIG. 4B, when the first and second tables 12 and 13 are moved simultaneously in the same direction (e.g., in the right direction in FIG. 4A) at the same rate by the drive mechanisms 15 and 16, the workpiece W is moved in the direction and transferred to the subsequent stage such as the die (Advance Operation). Further, from the state of FIG. 3A and FIG. 3B, when the first and second tables 12 and 13 are moved simultaneously in the same direction (e.g., in the right direction of FIG. 3A) and the first table 12 is moved faster than the second table 13, it is possible to transfer the workpiece W to the subsequent stage, such as, e.g., the die, while raising the workpiece W. When the operations of the tables 12 and 13 are correctly synchronized, the force of the fingers 21, 22 to grip the workpiece W will not be loosened, which can stably transfer the workpiece W.

After the workpiece W is transferred to the subsequent stage, the first and second tables 12 and 13 are moved in opposite directions so as to increase the distance therebetween. Even if the distance between the first and second tables 12 and 13 is increased, the arms 18 and 19 are still gripping the workpiece W because the tension spring 20 is biasing the arms 18 and 19 in the closing direction. When the first and second arm bases 12c and 13c are lowered along the inclined guides 12a and 13a, the workpiece W is also lowered (see FIG. 3B, Down Operation). The lower end is regulated by the lower stopper 12j. When the first table 12 is moved slower than the second table 13 while transferring the workpiece, it is possible to transfer the workpiece W while lowering it. By performing the lift operation and the down operation during the transferring operation, high-speed transferring can be attained.

From the state, when the table bodies 12a and 12b are driven to be away from each other, the arm bases 12c and 13c cannot be lowered any further. Therefore, the arms 18 and 19 are opened and the fingers 21 and 22 are opened as the table bodies 12b and 13b are moved away from each other (see FIG. 1A, FIG. 1B). With this operation, the workpiece W is placed on the subsequent stage (Unclamp Operation). At this time, as shown in FIG. 1A, the fingers 21, 22 are moved (retreated) away from the center of the die or the like. Then, in this state, the first and second tables 12 and 13 are simultaneously moved in the return direction (Return Operation). Press working is performed during the return operation. When the tables 12 and 13 have returned to their original stages, the operations are repeated from the initial clamp operation.

In cases where the upper die is large and it is not possible to sufficiently avoid the interference with the upper die by merely moving the fingers 21 and 22 toward the rail 11, it may be performed as follows. That is, the return operation is performed by a half pitch. In this state, the transfer mechanism is stopped, and the press working is performed. The return operation is continued by the remaining half pitch after the upper die is raised. By doing so, the fingers 21 and 22 are retracted (standby) at an intermediate position of dies at the adjacent steps, and therefore it is possible to assuredly avoid the interference between the fingers 21 and 22 and the die.

Figure 5:
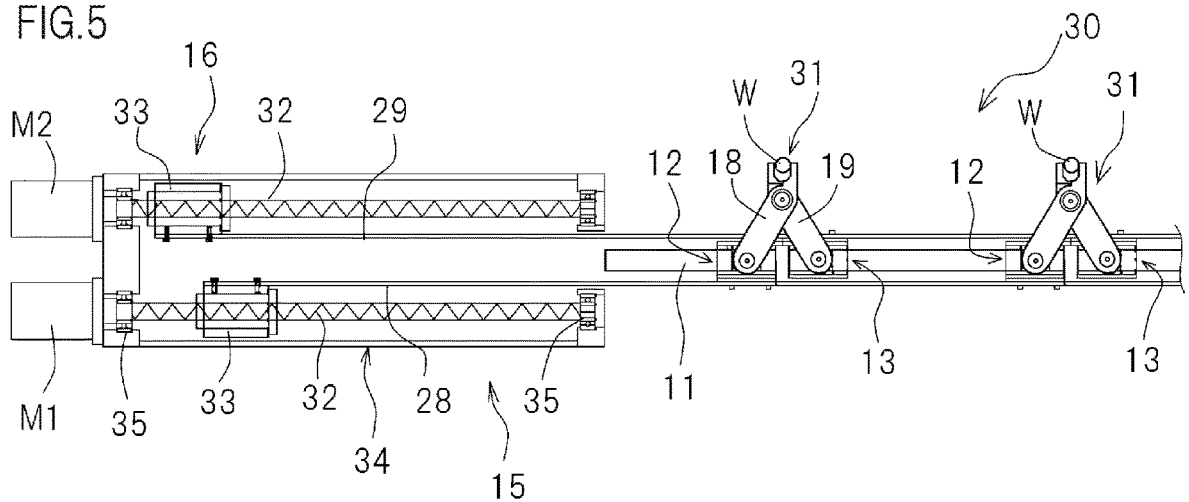
FIG. 5 is a plan view showing an embodiment of a transfer device of the present invention.

Next, referring to FIG. 5, an embodiment of a single rail type 3D (three-dimensional) transfer device will be described. This transfer device 30 is basically using the transfer mechanism 10 of FIG. 1A as it is. A plurality of plier mechanisms (gripping mechanisms) 31 composed of the first and second arms 18 and 19, etc., is provided on a single rail 11 in a travelable manner Although only two plier mechanisms are shown in FIG. 5, the number of plier mechanisms may be 3 or more, e.g., 5 to 10, depending on the number of processing steps of the pressing machine. The plier mechanisms 31 are spaced apart by the pitch of dies (feeding-pitch). Each plier mechanism 31 is similar to the plier mechanism 14 of FIG. 1A and FIGS. 1B and 1s provided with first and second arms 18 and 19, a pin 17, tables 12 and 13, a tension spring 20.

The table bodies 12b of the first tables 12 of the transfer mechanisms are connected by a first connection bar 28 and are driven simultaneously in the same direction by the same distance along the rail 11 by the first motor M. The first connection bar 28 is fixed to the front surface (lower side in FIG. 5) of each table body 12b. In this embodiment, a male screw 32 is connected to the output shaft of the first motor M1, and the first connection bar 28 is fixed to a nut 33 screwed to the male screw 32. Both ends of the male screw 32 are rotatably supported by bearings 35 and 35, such as, e.g., ball bearings, provided on a frame 34. The male screw 32 and the nut 33 are preferably a ball-screw and a ball-nut, respectively.

The same is applied to the second table 13. The table bodies 13b of the second tables 13 of the transfer mechanisms are connected by a second connection bar 29 and are driven to travel via the nut 33 and the male screw 32 by the second motor M2. Note that the second connection bar 29 is fixed to the rear surface (upper side of FIG. 5) of each table body 13b opposite to the first connection bar 28. With this, the first connection bar 28 and the second connection bar 29 are prevented from interfering with each other or sliding with each other.

The first and second motors M1 and M2 are preferably servo motors, thereby enabling easy control of the respective stopping positions, moving speeds, synchronous movement, and the like, of the first table 12 and the second table 13. The transfer direction of the workpiece can be set to either in the right direction or the left direction of FIG. 5 by the control programs of the first motor M1 and the second motor M2. Further, the workpiece feed pitches (the advance length, and the return length) can be selected arbitrarily.

In this transfer device 30, the weight of a number of tables 12 and 13, arms 18 and 19, and connection bars 28 and 29 is supported by the rail 11 and the support member (reference numeral 27 in FIG. 1B). Therefore, the inertia of the operating part is smaller than that of a transfer device using a feed bar. Therefore, it is possible to drive at high speed even with a low output motor. Further, since the movable portion is not provided with a motor and/or a reduction gear, the motor load can be further reduced.

Figure 6A:
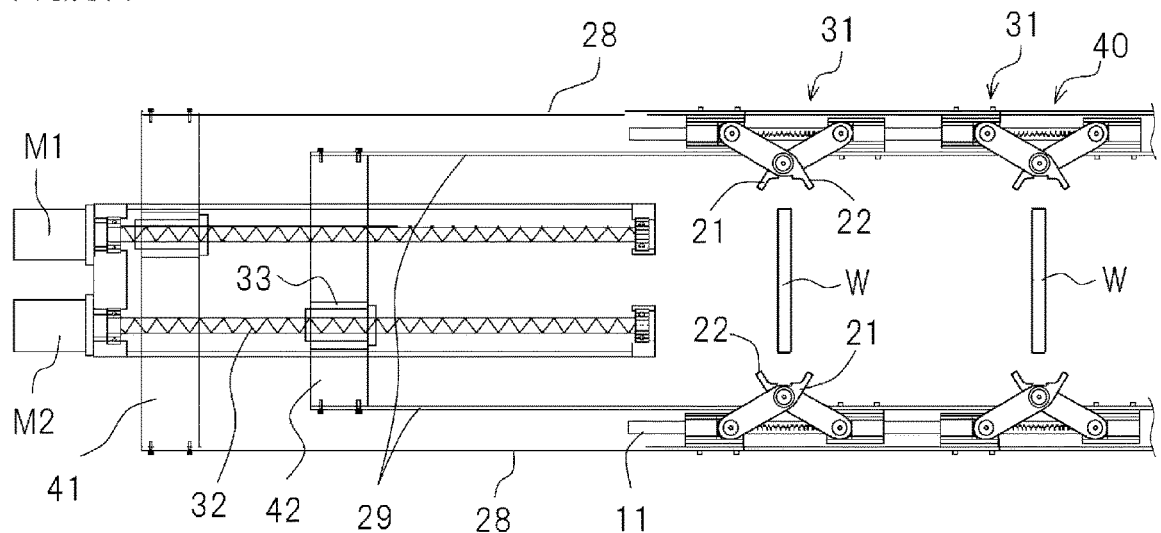
FIG. 6A is a plan view showing another embodiment of a transfer device of the present invention.
Figure 6B:
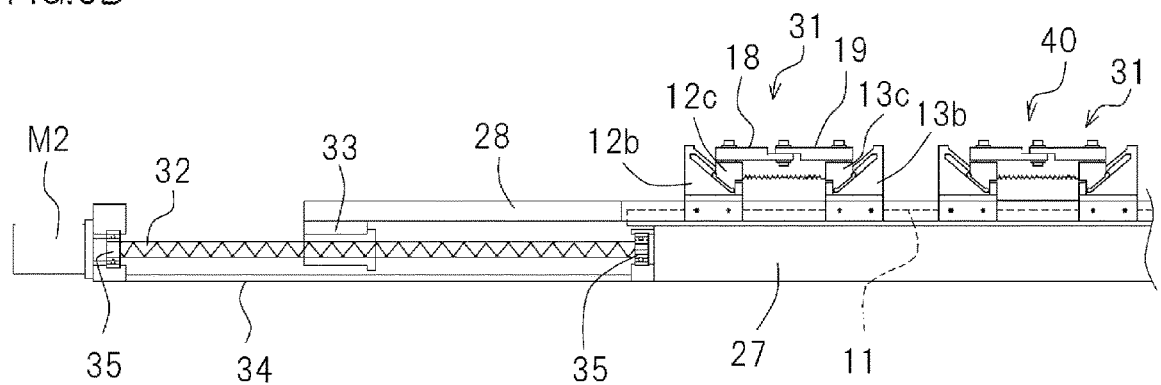
FIG. 6B is a front view of the transfer device of another embodiment of the present invention.

Next, referring to FIG. 6A and FIG. 6B, an embodiment of a double rail type 3D (three-dimensional) transfer device will be described. This transfer device 40 is basically composed of two sets of the above-described single rail type 3D (three-dimensional) transfer devices 30 combined to face each other. The fingers 21 and 22 are arranged in a face-to-face manner, and the ends of one workpiece W are clamped with the fingers 21 and 22 of the respective plier mechanisms. After lifting, advancing, and lowering the workpiece while holding it with both side fingers, the workpiece is unclamped. With this, the workpiece is transferred to the subsequent die. After unclamping, the transfer device returns to the original die position. Press working is performed during the return operation.

Note that each single-type transfer device may include two male screws, two nuts, and two motors M1 and M2. However, in the device of FIG. 6A, the first connection bar 28 of the transfer mechanism on the back side (the upper side in the drawing) and the first connection bar 28 of the transfer mechanism on the near side (the lower side in the drawing) are connected by the first crossbar 41. With this, the male screw 32, the nut 33, the motor M1 can be shared. The second connection bars 29 are similarly connected by a second crossbar 42. Thus, the number of parts can be reduced, and the control can be simplified.

Figure 7A:
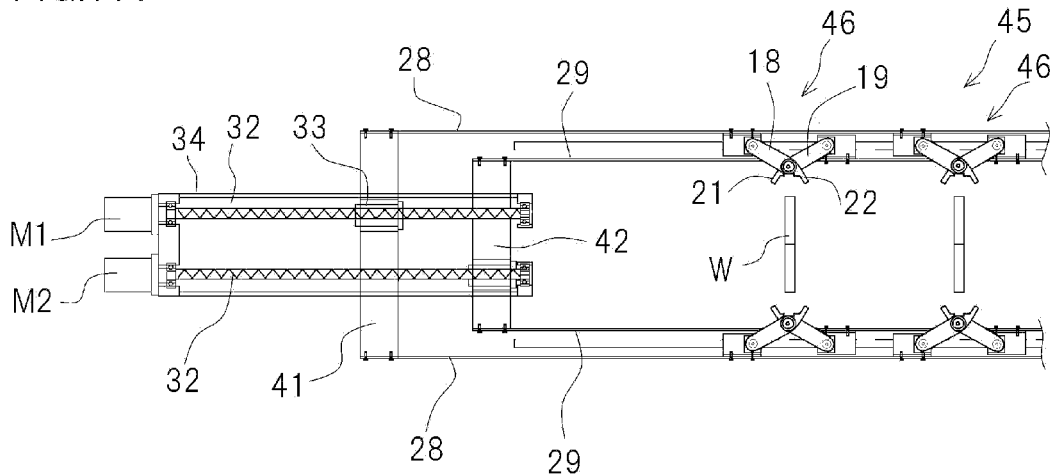
FIG. 7A is a plan view showing still another embodiment of a transfer device of the present invention in an unclamped state.
Figure 7B:
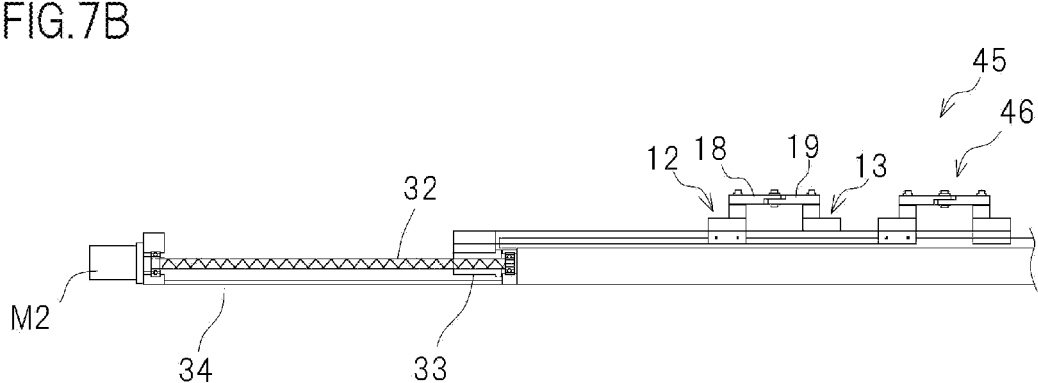
FIG. 7B is a front view of the transfer device of the another embodiment of the present invention in the unclamped state.
Figure 8:
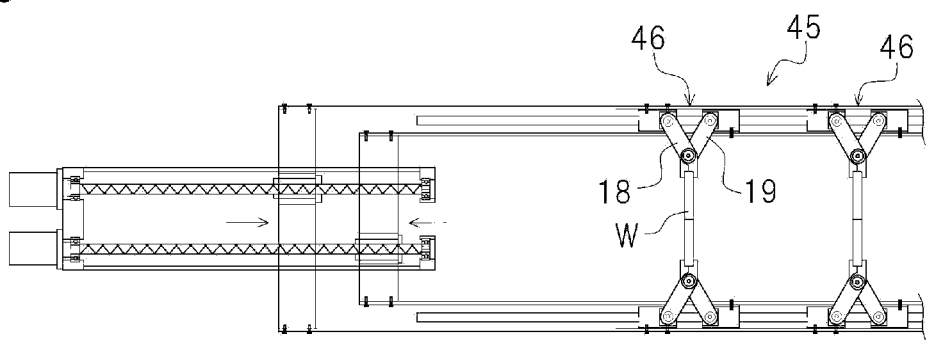
FIG. 8 is a plan view showing a clamped state of the transfer device of FIG. 7A.

FIG. 7A and FIG. 7B show an embodiment of a double rail type 2D (two-dimensional) transfer device. This transfer device 45 is not provided with lift/down mechanisms. That is, as shown in FIG. 7B, the table 12, 13 is not divided into a main body and an arm base and is integrally configured, or a plurality of components are integrally fixed. Workpieces W are clamped above the dies by the fingers 21 and 22 of the plier mechanisms 46 (see FIG. 8), advanced while maintaining the same feed height, and unclamped at the subsequent die (see FIG. 7A). Then, the plier mechanism 46 not gripping a workpiece is returned during which the pressing work is performed. In cases where lift/downward movement of the workpiece W is required, the operation is performed by a die cushion or a lift mechanism built into a die.

Even in the 2D (two-dimensional) transfer device 45 of FIG. 7A and FIG. 7B, the first connection bars 28 are connected by a first crossbar 41, and the second connection bars 29 are connected by a second crossbar 42. The above-described 3D (three-dimensional) transfer devices 30 and 40 can perform a 2D (two-dimensional) operation by the control of the motors. However, since the transfer device 45 of FIG. 7A and FIG. 7B is a 2D (two-dimensional) dedicated device in which the lift/down mechanism is omitted, the inertia is further small. Therefore, it is possible to drive at high speed with a low-power motor.

In a state in which the first and second tables 12 and 13 are being moved in the same direction by the advance/return operation, when the moving speeds of the respective tables 12 and 13 are changed, the tables 12 and 13 are moved relatively in the opposite directions. By moving relatively in opposite directions in this manner, it is possible to cause the first and second arms 18 and 19 to perform a clamp/unclamp operation while making the first and second arms 18 and 19 perform the advance/return operation. Thus, it is possible to attain much faster transferring.

Figure 9A:
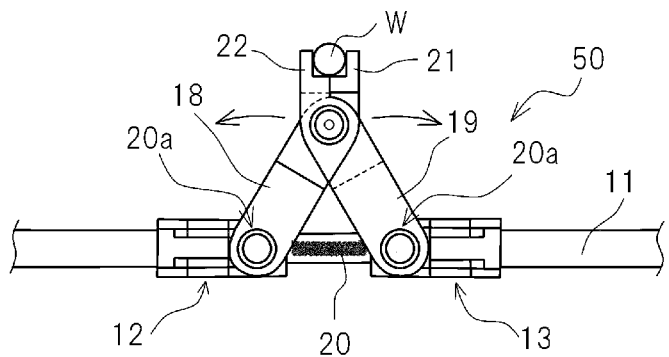
FIG. 9A is a plan view showing a clamped state of still yet another embodiment of a transfer mechanism of the present invention.
Figure 9B:
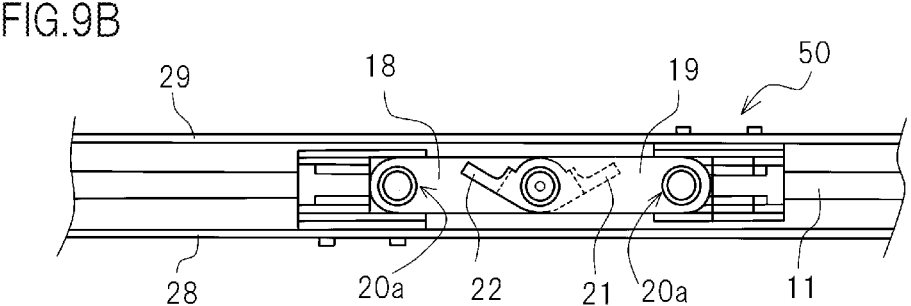
FIG. 9B is a plan view showing an unclamped state of the still yet another embodiment of a transfer mechanism of the present invention.
Figure 9C:
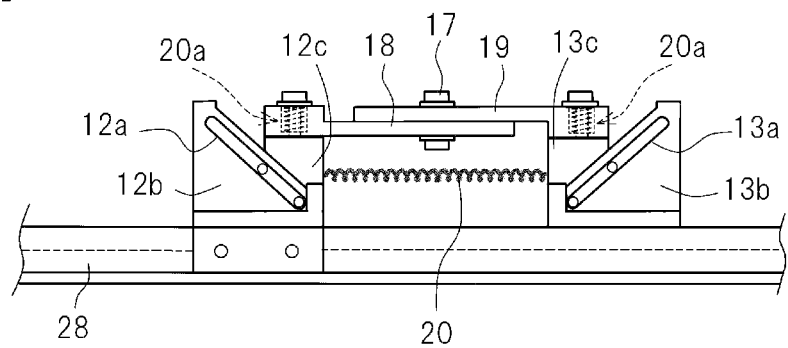
FIG. 9C is a front view of FIG. 9B.

In the transfer mechanism 50 shown in FIG. 9A to FIG. 9C, between the arm base 12c of the first table 12 and the first arm 18, a torsion coil spring 20a for pivotally biasing the first arm 18 in the clamping direction, i.e., in the counterclockwise direction in the drawing, is interposed. The coiled portion of the torsion coil spring 20a is disposed around the support shaft 25 with the one end engaged with the first arm 18 and the other end engaged with the arm base 12c. Between the second table 13 and the second arm 19, a torsion coil spring 20a for pivotally biasing the second arm 19 in the clamping direction, i.e., in the clockwise direction, is interposed.

As shown in FIG. 9B, when the arms 18 and 19 are rotated until the left and right support shafts 25 and 25 and the pin 17 are aligned in a straight line, the arms 18 and 19 do not protrude inward, which makes it easy to avoid interference between the arms and the die at the time of press working. However, in this state, even if a force is applied in a direction to bring the left and right arm bases 12c and 13c closer, no component force to rotate the arms 18 and 19 is generated. Therefore, by providing the torsion coil springs 20a and 20a for giving a rotational biasing force to the arms 18 and 19 as shown in FIG. 9A, it is possible to give an initial rotational power by the torsion coil springs 20a. When the arms 18 and 19 begin to rotate, it is possible to subsequently make the arms 18 and 19 smoothly perform the clamp/unclamp operation and the lift/down operation.

As described above, in particular as shown in FIG. 9B, in the case of opening the arms 18 and 19 until the left and right support shafts 25 and 25 and the pin 17 connecting the arms 18 and 19 are aligned in a straight line, the torsion coil springs 20a and 20a can assist the action of the tension coil spring 20 for biasing to bring the arm bases 12c and 13c closer. Note that in cases where a sufficient clamping force can be ensured only by providing the torsion coil springs 20a and 20a, the tension coil spring 20 may be omitted.

Figure 9D:
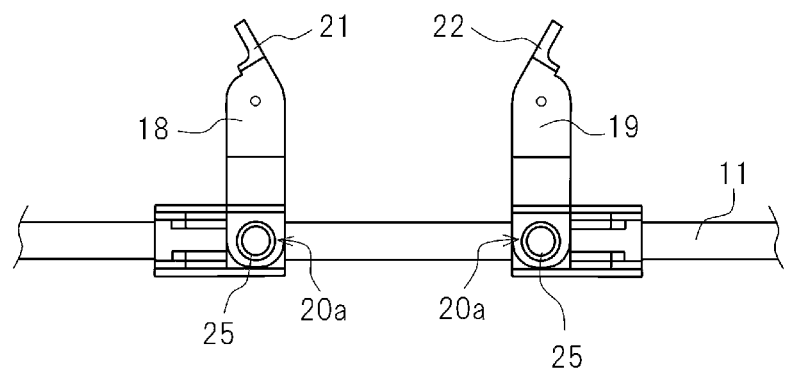
FIG. 9D is a plan view in a state in which a plier fulcrum is removed.

Between the arms 18 and 19 and the arm base 12c, 13c, it is preferably to provide a stopper so that the arm 18 and 19 does not rotate beyond a right angle with respect to the rail 11. In this case, prior to connecting both the arms 18 and 19 and 13 by the support shaft 25, as shown in FIG. 9D, the arms 18 and 19 are rotated until the arms 18 and 19 become perpendicular to the rail 11. Therefore, assembly work becomes easier. It is sufficient to provide one of the right and left torsion coil springs 20a and 20a, but it is possible to attain a smooth operation by providing both the torsion coil springs.

Several embodiments have been described above. However, the present invention is not limited thereto, and various modifications can be made. For example, in the above-described embodiments, a male screw (or ball screw) and a nut (or ball nut) are used to convert the motor revolution into a linear motion of the table. However, a linear motor may be provided between the rail and the table to directly drive the table. Additionally, a winding element, such as, e.g., a wire cable and a chain, may be utilized to convert the rotational motion of the motor into a reciprocating linear motions of the tables 12 and 13.

Further, it may be configured such that nuts (or ball nuts) are fixed to the rear surfaces of a plurality of first tables 12, a single male screw screwed to nuts is rotatably driven by the first motor, nuts (or ball nuts) are fixed on the front surfaces of a plurality of second tables, and a single male screw screwed to the nuts is rotatably driven by the second motor.

Note that in the case of a double rail type transfer device, it may be configured such that in addition to gripping the ends of the workpiece with fingers, both side ends of the workpiece are clamped by the opposed fingers when the fingers approach the center side, and both side ends of the workpiece are unclamped when the fingers are away from the center side. In the case of a workpiece with flanges, more stable transferring can be achieved by clamping the lower side of the flange.

The invention claimed is:

1. A transfer mechanism comprising:
a rail;
a first table and a second table, the first table and the second table being movably mounted on the rail;
a first arm and a second arm, the first arm and the second arm being pivotably supported by the first table and the second table, respectively;
a first drive mechanism and a second drive mechanism being configured to independently move the first table and the second table along the rail, respectively,
wherein the first arm and the second arm are pivotally connected to each other at a position between a tip side and a base side thereof,
wherein tip side portions of the first arm and the second arm than a connected portion of the first arm and the second arm serve as fingers for holding a workpiece,
wherein a relative movement of the first table and the second table in opposite direction by the first drive mechanism and the second drive mechanism causes the first arm and the second arm to perform a clamp/unclamp operation, and
wherein a coordinated movement of the first table and the second table in the same direction causes the first arm and the second arm to perform an advance/return operation.

2. The transfer mechanism as recited in claim 1,
wherein the first table and the second table each are composed of a table body provided with an inclined guide and an arm base slidably provided along the inclined guide,
wherein a base of the first arm and a base of the second arm are pivotably supported by the respective arm bases, and
wherein the inclined guide of the first table and the inclined guide of the second table are inclined in opposite directions so as to be gradually away from each other as they go upward.

3. The transfer mechanism as recited in claim 2,
wherein the arm base is biased downward of the inclined guide.

4. The transfer mechanism as recited in claim 1,
wherein a plurality of sets of the first table and the second table is provided on the rail,
wherein the first drive mechanism is configured to collectively move a plurality of the first tables, and
wherein the second drive mechanism is configured to collectively move a plurality of the second tables.

5. The transfer mechanism as recited in claim 2,
wherein a plurality of sets of the first table and the second table is provided on the rail,
wherein the first drive mechanism is configured to collectively move a plurality of the first tables, and
wherein the second drive mechanism is configured to collectively move a plurality of the second tables.

6. The transfer mechanism as recited in claim 3,
wherein a plurality of sets of the first table and the second table is provided on the rail,
wherein the first drive mechanism is configured to collectively move a plurality of the first tables, and
wherein the second drive mechanism is configured to collectively move a plurality of the second tables.

7. A transfer device comprising:
two transfer mechanisms as recited in claim 1,
wherein the two transfer mechanisms are arranged to face each other.

8. The transfer device as recited in claim 7,
wherein the first tables of the two transfer mechanisms arranged to face each other are driven by a single first drive mechanism, and the second tables of the two transfer mechanisms arranged to face each other are driven by a single second drive mechanism.

* * * * *